United States Patent
Ruan

(10) Patent No.: US 12,394,937 B1
(45) Date of Patent: Aug. 19, 2025

(54) WATERPROOF CONNECTOR, CABLE EXTENSION CORD AND WATERPROOF STRING LIGHT

(71) Applicant: Ningbo Maoli Electric Appliance Co., Ltd, Zhejiang (CN)

(72) Inventor: Lidan Ruan, Zhejiang (CN)

(73) Assignee: NINGBO MAOLI ELECTRIC APPLIANCE CO., LTD, Zhejiang (CN)

( * ) Notice: Subject to any disclaimer, the term of this patent is extended or adjusted under 35 U.S.C. 154(b) by 0 days.

(21) Appl. No.: 18/900,412

(22) Filed: Sep. 27, 2024

Related U.S. Application Data

(63) Continuation of application No. 18/584,723, filed on Feb. 22, 2024, now Pat. No. 12,126,114.

(30) Foreign Application Priority Data

Feb. 6, 2024 (CN) .......................... 202420284391.3

(51) Int. Cl.
| | |
|---|---|
| H01R 13/00 | (2006.01) |
| F21S 4/10 | (2016.01) |
| F21S 9/03 | (2006.01) |
| F21V 23/06 | (2006.01) |
| F21V 31/00 | (2006.01) |
| H01R 13/52 | (2006.01) |
| H01R 13/622 | (2006.01) |
| H02S 40/34 | (2014.01) |

(52) U.S. Cl.
CPC .............. *H01R 13/622* (2013.01); *F21S 4/10* (2016.01); *F21S 9/03* (2013.01); *F21V 23/06* (2013.01); *F21V 31/005* (2013.01); *H01R 13/5213* (2013.01); *H02S 40/34* (2014.12)

(58) Field of Classification Search
CPC .......... H01R 13/622; H02S 40/34; F21S 4/10; F21S 9/03; F21V 23/06; F21V 31/003
See application file for complete search history.

(56) References Cited

U.S. PATENT DOCUMENTS

| | | | |
|---|---|---|---|
| 5,350,315 A | 9/1994 | Cheng | |
| 6,267,342 B1 * | 7/2001 | Huang | F21V 21/08 |
| | | | 362/396 |
| 8,888,528 B2 * | 11/2014 | Van Swearingen | H01R 9/05 |
| | | | 439/578 |
| 2014/0273568 A1 | 9/2014 | Lin | |
| 2019/0003667 A1 | 1/2019 | Marasco | |

FOREIGN PATENT DOCUMENTS

WO 2015125029 A4 12/2015

\* cited by examiner

*Primary Examiner* — Phuong Chi Thi Nguyen

(57) ABSTRACT

The present disclosure provides a waterproof connector which is configured to connect cables, the connector including: a first interface which includes: a plug handle; and a first waterproof cap which is sleeved on an outer side of the plug handle; and a second interface which includes: a socket handle. The plug is capable of being selectively inserted in the socket such that an end face of a first end of the plug handle is closely fitted with an end face of a first end of the socket handle.

15 Claims, 9 Drawing Sheets

WATERPROOF CONNECTOR, CABLE EXTENSION CORD AND WATERPROOF STRING LIGHT

CROSS-REFERENCE TO RELATED APPLICATIONS

The application is a continuation of U.S. patent application Ser. No. 18/584,723, which claims priority of Chinese patent application CN 202420284391.3, filed on Feb. 6, 2024, both of which are incorporated herein by reference in their entireties.

TECHNICAL FIELD

The present disclosure relates to the technical field of illumination lights, in particular to a waterproof connector, a cable extension cord and a waterproof string light.

BACKGROUND

String lights are not only widely applied to occasional decoration for various festivals, home decoration and various entertainment venues, but also widely applied to lighting projects of cities. Due to different application scenes, the lengths of the string lights are also different. In one case, there is no node in the string lights, and the string lights are cut off after the actual lengths are measured. If the applied shape is relatively complex, the difficulty in construction will be increased due to the excessively long string lights. In addition, the relatively long string lights are also adverse to later maintenance, and if one part of the string light breaks down, it is highly possible that the entire string light needs to be replaced. Therefore, during construction, a plurality of relatively short string lights are usually connected into a relatively long string light in a spliced manner. The splicing manner has multiple advantages, but also has some defects, particularly at the junctions of the string lights. The problems about waterproofness, falling-off prevention and convenience in connection at junctions need to be solved.

SUMMARY

A first aspect of the present application provides the waterproof connector which is configured to connect cables, including: a first interface which includes a plug handle, a first end of the plug handle is provided with a plug extending outwards, a junction of the plug and the cable is encapsulated in the plug handle; a second interface which includes a socket handle, a first end of the socket handle is provided with a socket extending inwards, a junction of the socket and the cable is encapsulated in the socket handle; a first waterproof cap, sleeved on an outer side of the plug handle and an outer side of the socket handle; and the plug is capable of being selectively inserted in the socket, such that an end face of the first end of the plug handle is closely fitted with an end face of the first end of the socket handle.

A second aspect of the present application provides the cable extension cord, including: a cable; and a waterproof connector which is configured to connect cables and includes: a first interface which includes: a plug handle, a first end of the plug handle is provided with a plug extending outwards, a junction of the plug and the cable is encapsulated in the plug handle; a second interface which includes a socket handle, a first end of the socket handle is provided with a socket extending inwards, a junction of the socket and the cable is encapsulated in the socket handle; a first waterproof cap, sleeved on an outer side of the plug handle and an outer side of the socket handle; the plug is capable of being selectively inserted in the socket such that an end face of the first end of the plug handle is closely fitted with an end face of the first end of the socket handle; a first end of the cable is provided with the first interface of the waterproof connector; and a second end of the cable is provided with the second interface of the waterproof connector.

A third aspect of the present application provides the waterproof string light, including cables; and waterproof connectors which are configured to connect the cables, each of the waterproof connectors includes a first interface which includes a plug handle, a first end of the plug handle is provided with a plug extending outwards, a junction of the plug and the cable is encapsulated in the plug handle; a second interface which includes a socket handle, a first end of the socket handle is provided with a socket extending inwards, a junction of the socket and the cable is encapsulated in the socket handle; the plug is capable of being selectively inserted in the socket, such that an end face of the first end of the plug handle is closely fitted with an end face of the first end of the socket handle; a first end of each of the cables is provided with at least one of the first interface of the waterproof connectors, and a second end of the cable is provided with at least one of the second interface of the waterproof connectors; and the cables are provided with a plurality of light modules.

BRIEF DESCRIPTION OF THE DRAWINGS

Drawings constituting part of the present application are used for providing a further understanding to the present disclosure. Schematic embodiments of the present disclosure and descriptions thereof are intended to explain the present disclosure, and should not be construed to unduly limit the present disclosure.

DETAILED DESCRIPTION OF EMBODIMENTS

The present disclosure is described in detail below with reference to the accompanying drawings and in conjunction with embodiments. Each example is provided to explain the present disclosure instead of limiting the present disclosure. In fact, those skilled in the art will know that modifications and variations may be made in the present disclosure without departing from the scope or spirit of the present disclosure. For example, features shown or described as part of one embodiment may be used in another embodiment to produce yet another embodiment. Therefore, it is expected that the present disclosure includes such modifications and variations that fall within the scope of the appended claims and equivalents thereof.

In the descriptions of the present disclosure, orientations or positional relationships indicated by the terms "longitudinal", "transverse", "upper", "lower", "front", "rear", "left", "right", "vertical", "horizontal", "top", "bottom" and the like are orientations or positional relationships based on the drawings, are only for the purpose of facilitating describing of the present disclosure, and do not indicate that the present disclosure must be constructed and operated in the specific orientations. Therefore, they cannot be understood as limitations on the present disclosure. The terms "connection", "connecting" and "arrangement" used in the present disclosure should be understood in a broad sense, for example, the connection may be fixed connection, and may also be detachable connection; the connection may be direct connection, and may also be indirect connection by means of intermediate components; the connection may be wired electrical connection and wireless electrical connection, and may also be wireless communication signal connection; and for those of ordinary skill in the art, the specific meanings of the above-mentioned terms can be understood according to the specific situations.

The accompanying drawings show one or more examples of the present disclosure. Numeral and letter marks are used in the detailed descriptions to refer to the features in the accompanying drawings. Similar or like reference signs in the accompanying drawings and descriptions have been used to refer to similar or like parts of the present disclosure. As used herein, the terms "first", "second", "third" and the like are used interchangeably to distinguish one component from another, and are not intended to indicate the positions or importance of individual components.

Figure 1:
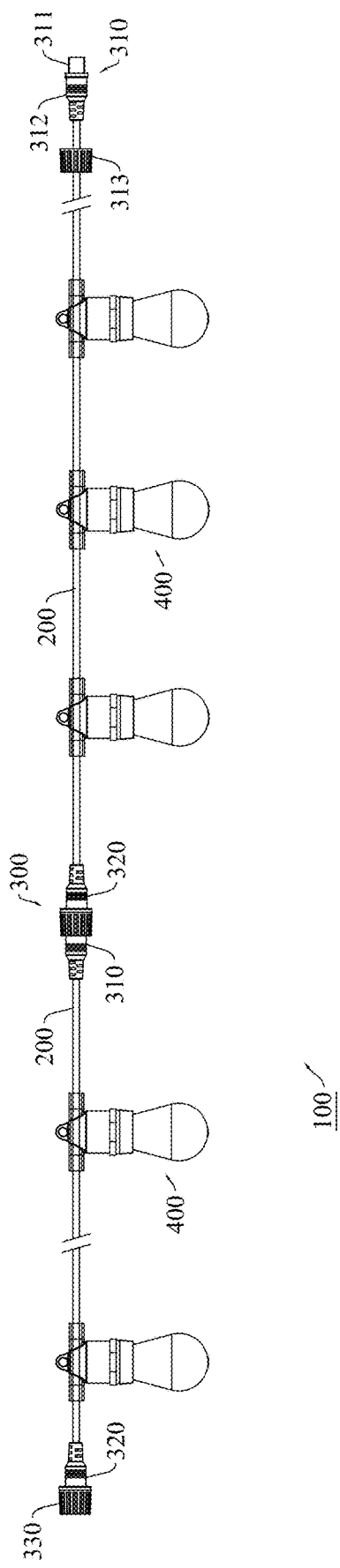
FIG. 1 is an overall structural schematic diagram of a string light.

As shown in FIG. 1, according to an embodiment of the present disclosure, a waterproof string light 100 is provided and includes cables 200, where the cables 200 are provided with a plurality of light modules 400. Two string lights 100 are in circuit connection with each other by means of a connector 300 having a waterproof function.

The connector 300 having the waterproof function includes a first interface 310 and a second interface 320 which can be separated from or combined with each other.

Figure 2:
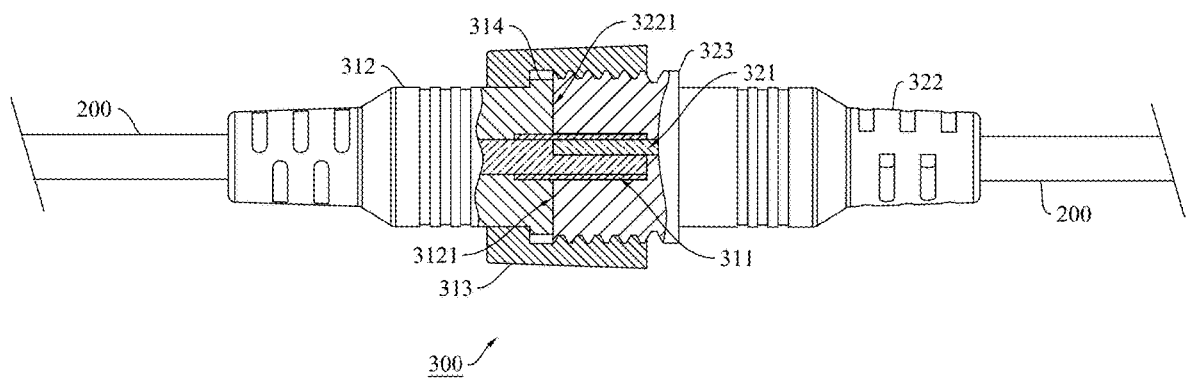
FIG. 2 is a structural schematic diagram of a first embodiment of a waterproof connector.
Figure 3:
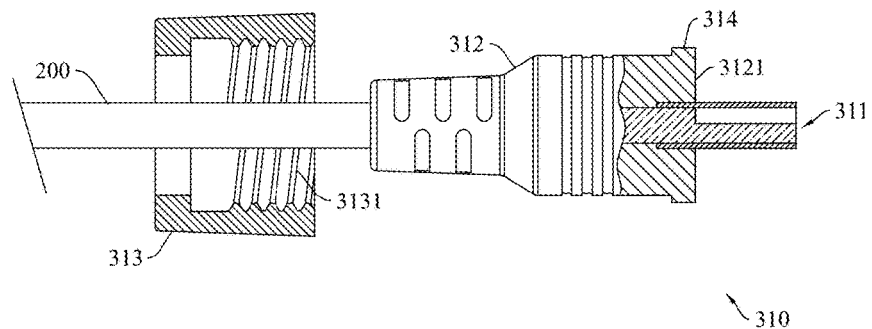
FIG. 3 is a structural schematic diagram of a first interface of the waterproof connector in FIG. 2.
Figure 4:
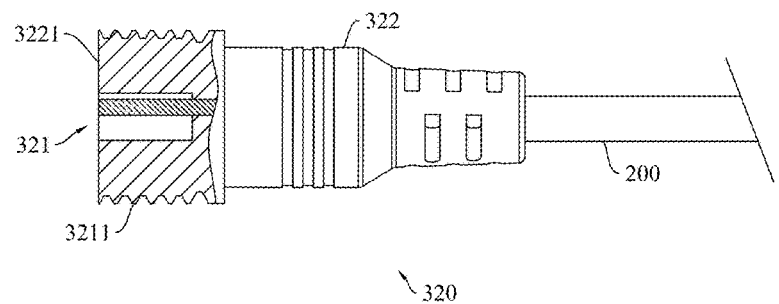
FIG. 4 is a structural schematic diagram of a second interface of the waterproof connector in FIG. 2.

Specifically, as shown in FIG. 2, FIG. 3 and FIG. 4, the first interface 310 includes a plug handle 312, a first end 3121 of the plug handle 312 is provided with a plug 311 protruding outwards in an axial direction of the plug handle 312, and the plug 311 is provided with a first electrical connection member; a second end of the plug handle 312 is provided with the cable 200; and the plug 311 is electrically connected to the cable 200 inside the plug handle 312. An outer side of the plug handle 312 is sleeved with a first waterproof cap 313, and an inner wall of the first waterproof cap 313 is provided with an internal thread 3131. The plug handle 312 is provided with an annular first protruding edge 314 extending outwards in a radial direction thereof. The bottom of the first waterproof cap 313 abuts against the first protruding edge 314, such that the first waterproof cap 313 is limited on the plug handle 312, thereby preventing the first waterproof cap 313 from falling off from the plug handle 312.

In some embodiments, a junction of the plug 311 and the cable 200 is encapsulated in the plug handle 312 in an injection-molded manner, which is beneficial to the waterproofness of the connector 300.

The second interface 320 includes a socket handle 322, a first end 3221 of the socket handle 322 is provided with a socket 321 recessed inwards in an axial direction of the socket handle 322, and the socket 321 is internally provided with a second electrical connection member; a second end of the socket handle 322 is provided with the cable 200; and the socket 321 is electrically connected to the cable 200 inside the socket handle 322. An outer wall of the first end 3221 of the socket handle 322 is provided with an external thread 3211 fitted with the internal thread 3131 of the first waterproof cap 313.

In some embodiments, a junction of the socket 321 and the cable 200 is encapsulated in the socket handle 322 in an injection-molded manner, which is beneficial to the waterproofness of the connector 300.

When the first interface 310 and the second interface 320 are combined and connected, the plug 311 can be inserted into the socket 321, and the first interface 310 is in circuit connection with the second interface 320 by means of mutual fitting of the first electrical connection member and the second electrical connection member. By means of threaded connection between the first waterproof cap 313 and the socket handle 322, an end face of the first end 3121 of the plug handle 312 can be closely fitted with an end face of the first end 3221 of the socket handle 322, thereby achieving the waterproofness of the connection members.

Figure 5:
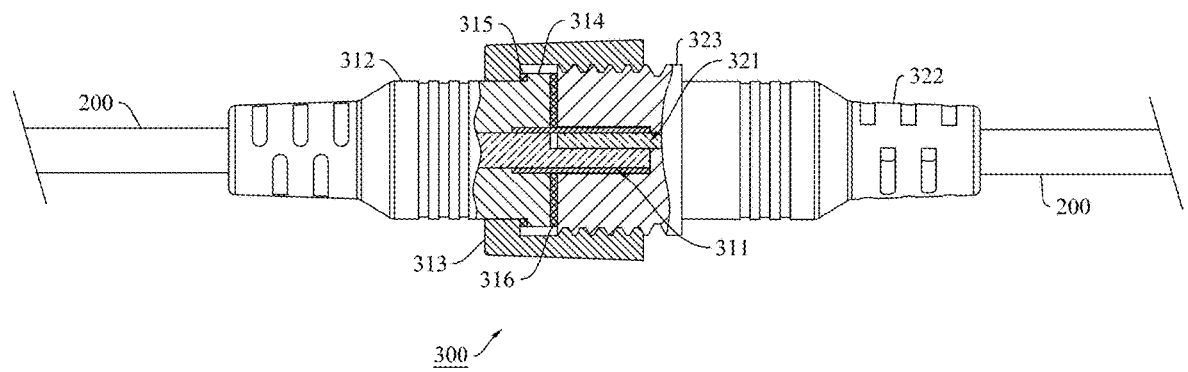
FIG. 5 is a structural schematic diagram of a second embodiment of the waterproof connector.
Figure 6:
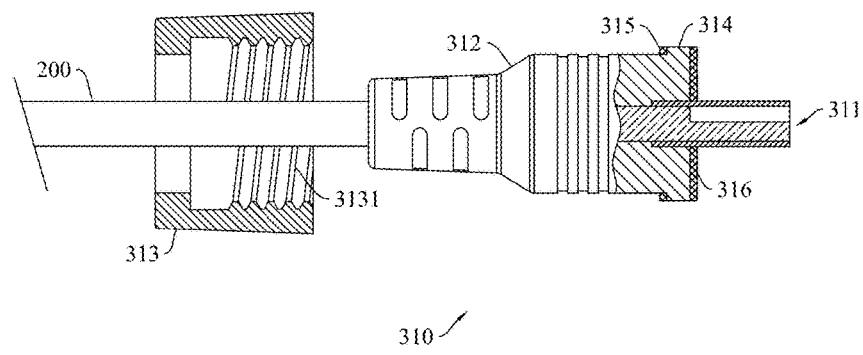
FIG. 6 is a structural schematic diagram of a first interface of the waterproof connector in FIG. 5.

As shown in FIG. 5 and FIG. 6, in some embodiments, the outer side of the plug handle 312 is sleeved with an annular first waterproof gasket 315, and the first waterproof gasket 315 is provided between the first waterproof cap 313 and the first protruding edge 314. After the first waterproof cap 313 is in threaded connection with the socket handle 322, the waterproofness between the first waterproof cap 313 and the first protruding edge 314 is improved by means of the first waterproof gasket 315.

In some embodiments, in order to improve the waterproofness of the connector 300, a second waterproof gasket 316 is provided between the end face of the first end 3121 of the plug handle 312 and the end face of the first end 3221 of the socket handle 322. After the first waterproof cap 313 is in threaded connection with the socket handle 322, the waterproofness between the end face of the first end 3121 of the plug handle 312 and the end face of the first end 3221 of the socket handle 322 is improved by means of the second waterproof gasket 316.

Figure 7:
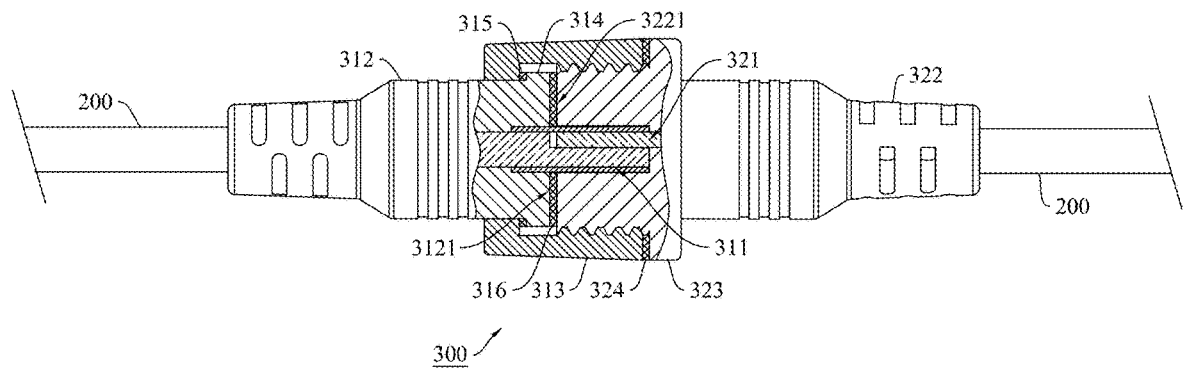
FIG. 7 is a structural schematic diagram of a third embodiment of the waterproof connector.
Figure 8:
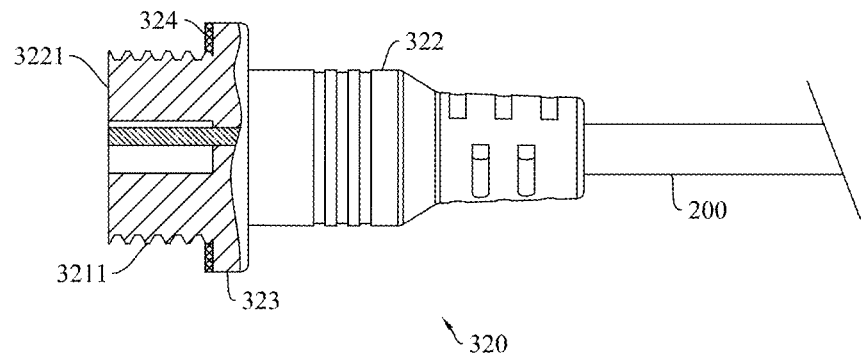
FIG. 8 is a structural schematic diagram of a second interface of the waterproof connector in FIG. 7.

As shown in FIG. 7 and FIG. 8, although the threaded connection has certain waterproofness, in order to further improve the waterproofness of a threaded end of the socket handle 322, in some embodiments, the socket handle 322 is provided with an annular second protruding edge 323 extending outwards in a radial direction thereof. After the first waterproof cap 313 is in threaded connection and fastened with the socket handle 322, an end of the first waterproof cap 313 abuts against and is closely fitted with the second protruding edge 323, thereby improving the waterproofness of the threaded end of the socket handle 322.

In some embodiments, an outer side of the socket handle 322 is sleeved with an annular third waterproof gasket 324, and the third waterproof gasket 324 is provided between the first waterproof cap 313 and the second protruding edge 323. After the first waterproof cap 313 is in threaded connection with the socket handle 322, the waterproofness between the first waterproof cap 313 and the second protruding edge 323 is improved by means of the third waterproof gasket 324.

Figure 9:
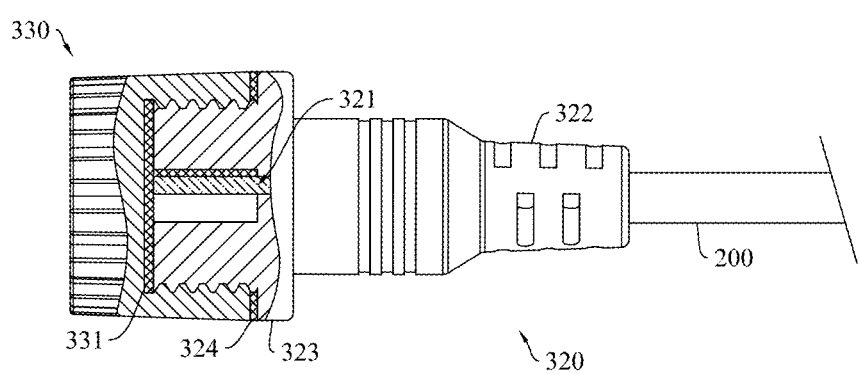
FIG. 9 is a structural schematic diagram of a fourth embodiment of the waterproof connector.
Figure 10:
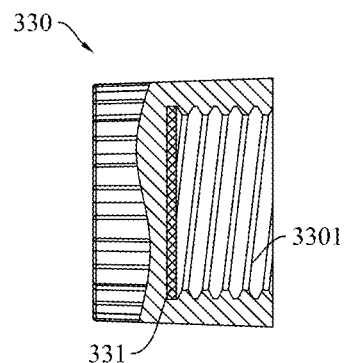
FIG. 10 is a structural schematic diagram of a second waterproof cap of the waterproof connector in FIG. 9.

As shown in FIG. 8, FIG. 9 and FIG. 10, in some embodiments, a first end of the string light 100 is provided with the first interface 310, and a second end of the string light 100 is provided with the second interface 320. The first interface 310 is connected to a power supply end, and the second interface 320 can be selectively connected to the first interface 310 of another string light 100. If the second interface 320 is a tail end, it needs to be sealed to prevent electric leakage or water inflow. Therefore, the connector 300 in the present application includes a second waterproof cap 330, and the second interface 320 is sealed by means of the second waterproof cap 330. Specifically, the second waterproof cap 330 is provided with a blind hole, and an inner wall of the blind hole is provided with an internal thread 3301 fitted and connected to the external thread 3211 of the socket handle 322. After the second waterproof cap 330 is in threaded connection with the socket handle 322, a bottom surface of the blind hole of the second waterproof cap 330 abuts against and is closely fitted with the end face of the first end 3221 of the socket handle 322, thereby achieving the waterproof effect.

In some embodiments, the bottom of the blind hole is provided with a fourth waterproof gasket 331, which can further improve the waterproofness between the second waterproof cap 330 and the socket handle 322.

In the above embodiments, the plug 311 is a USB plug 311, and the socket 321 is a USB socket 321. The plug 311 is electrically connected to the socket 321 by means of a USB protocol. The plug and the socket have the advantages that the USB interface technology is relatively mature, the application range is relatively large, and the universality is high. The production cost and later maintenance cost of the product can be reduced. However, it is not excluded that the plug 311 and the socket 321 can be of other electric insertion connection structures.

Each of the light modules 400 at least includes a light holder 402 and a bulb 401, and the respective cable 200 is electrically connected to the light holder 402.

Figure 11:
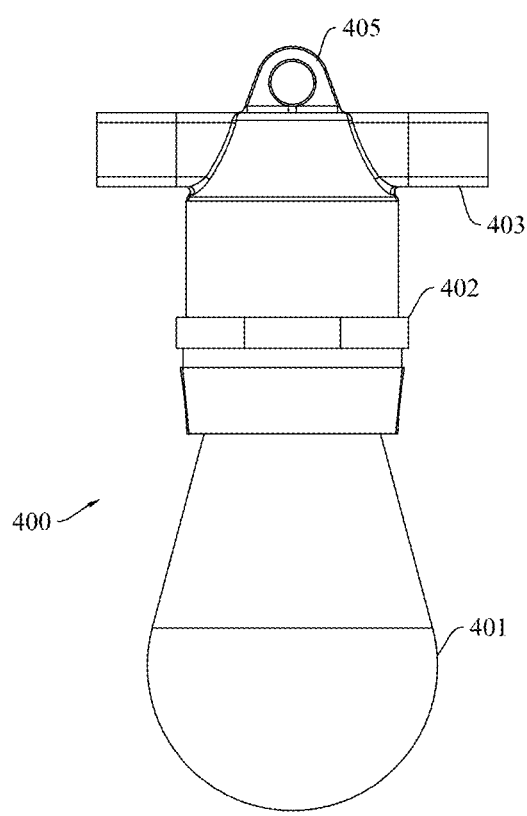
FIG. 11 is a structural schematic diagram of a first embodiment of a light module.

As shown in FIG. 11, in some embodiments, the light module 400 is further provided with a connection base 403. The connection base 403 is a part of the light holder 402, and an electrical connection node of the cable 200 and the light module 400 is provided in the connection base 403.

Figure 12:
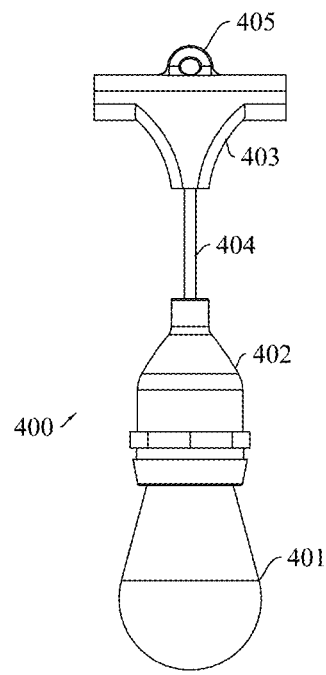
FIG. 12 is a structural schematic diagram of a second embodiment of the light module.

As shown in FIG. 12, in some embodiments, the light module 400 is further provided with a connection base 403. The connection base 403 is separated from the light holder 402 and is electrically connected to the light holder by means of a wire 404. An electrical connection node of the cable 200 and the light module 400 is provided in the connection base 403.

Figure 13:
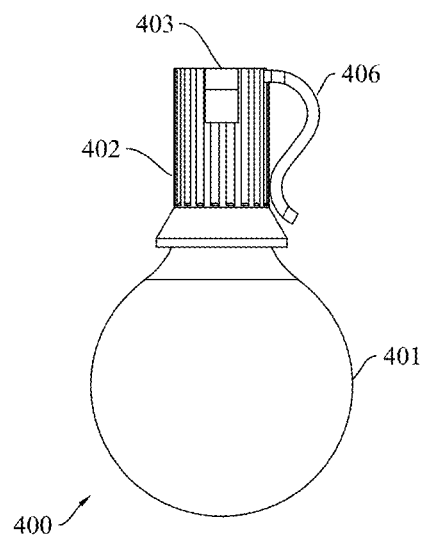
FIG. 13 is a structural schematic diagram of a third embodiment of the light module.

In some embodiments, the light module 400 is further provided with a hanging member, for example, as shown in FIG. 11 and FIG. 12, the hanging member is a hanging lug 405 provided on the light holder 402 or the connection base 403; or as shown in FIG. 13, the hanging member is a hook 406 provided on the light holder 402.

The power supply end can be flexibly selected for the string light 100.

Figure 14:
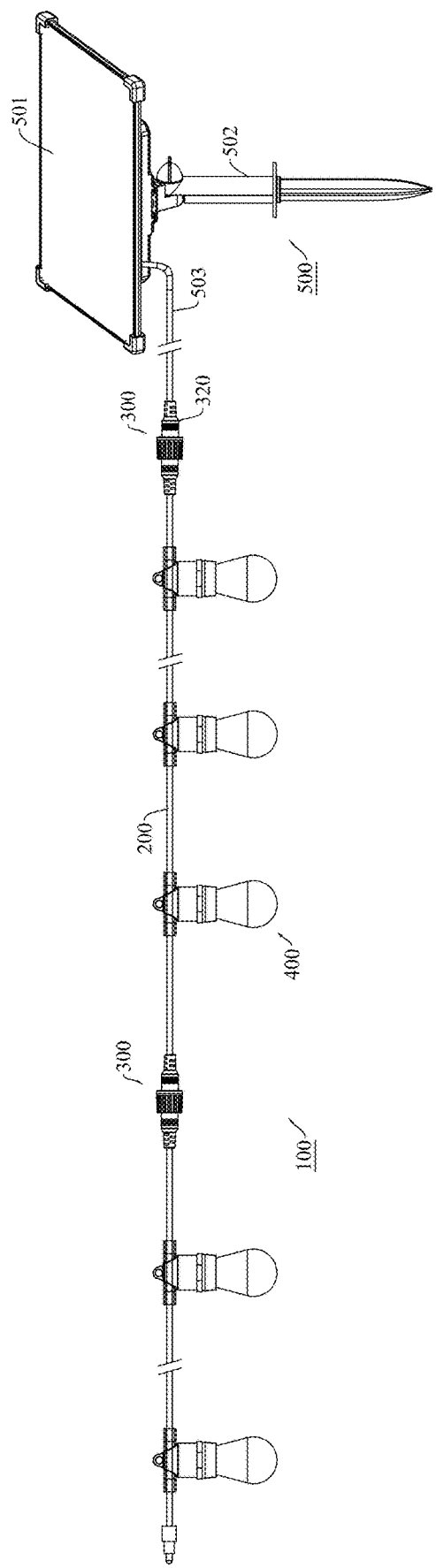
FIG. 14 is an overall structural schematic diagram of a string light with a solar power supply device.
Figure 15:
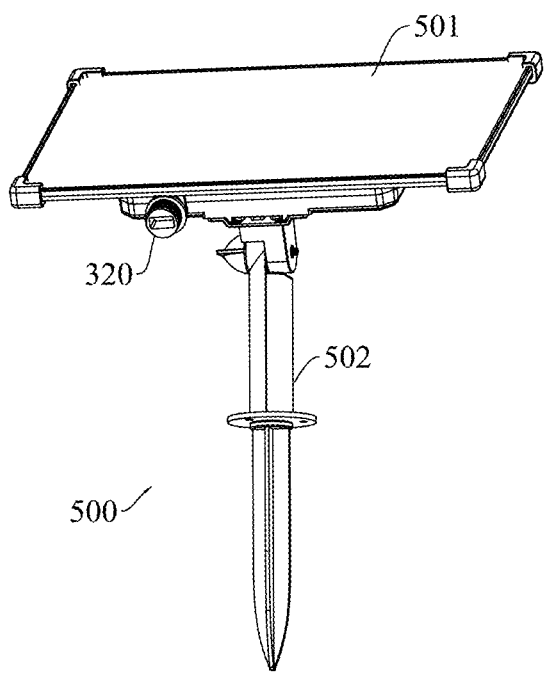
FIG. 15 is a structural schematic diagram of the second type of solar power supply device.

As shown in FIG. 14, in some embodiments, the power supply end includes a solar power supply device 500. The solar power supply device 500 includes a circuit board, and a solar cell panel 501 and the first interface 310 or/and the second interface 320 of the connector 300 which are electrically connected to the circuit board, and further includes a support frame 502. The first interface 310 or/and the second interface 320 of the connector 300 is/are electrically connected to the circuit board by means of a cable 503; or as shown in FIG. 15, the first interface 310 or/and the second interface 320 of the connector 300 can be directly provided on the circuit board. In some embodiments, the solar power supply device 500 is further provided with a cell, and the cell is electrically connected to the circuit board.

Figure 16:
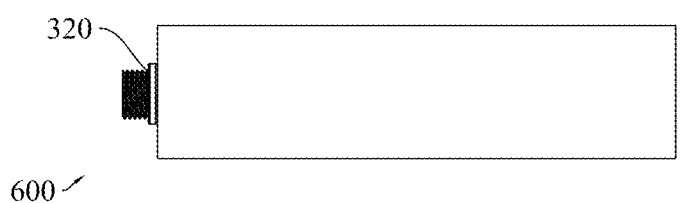
FIG. 16 is a structural schematic diagram of the first type of mobile power supply apparatus.

As shown in FIG. 16, in some embodiments, the power supply end includes a mobile power supply apparatus 600. The mobile power supply apparatus 600 includes a cell and a circuit board electrically connected to the cell. The circuit board is provided with the first interface 310 or/and the second interface 320 of the connector 300.

Figure 17:
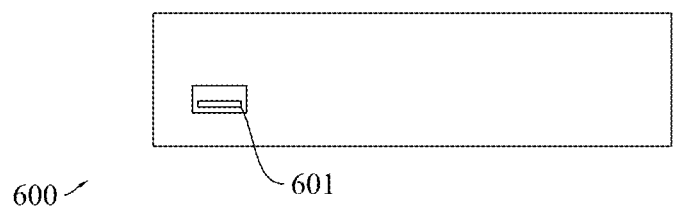
FIG. 17 is a structural schematic diagram of the second type of mobile power supply apparatus.

As shown in FIG. 17, in some embodiments, the power supply end includes a mobile power supply apparatus 600. The mobile power supply apparatus 600 includes a mobile power source, and the mobile power source is provided with a USB power supply interface 601. Of course, the first interface 310 or/and the second interface 320 of the string light 100 is/are corresponding USB power supply interfaces.

Of course, the power supply end can use a universal power adapter, and the power adapter uses the USB power supply interfaces. The first interface 310 or/and the second interface 320 of the string light 100 is/are the corresponding USB power supply interfaces.

Figure 18:
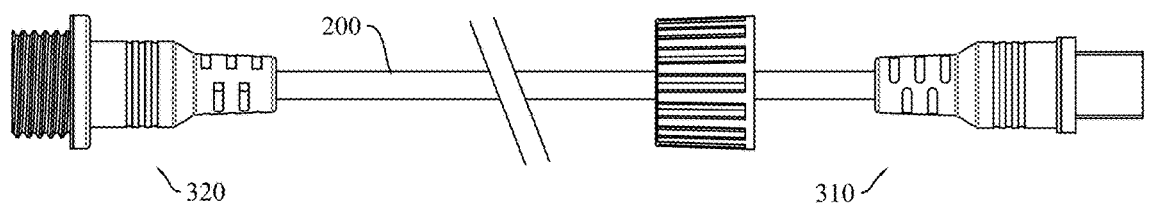
FIG. 18 is a structural schematic diagram of the first type of cable extension cord.

As shown in FIG. 18, the present application provides a cable extension cord, a first end of the cable extension cord being provided with the first interface 310 of the connector 300, and a second end of the cable extension cord being provided with the second interface 320 of the connector 300.

Figure 19:
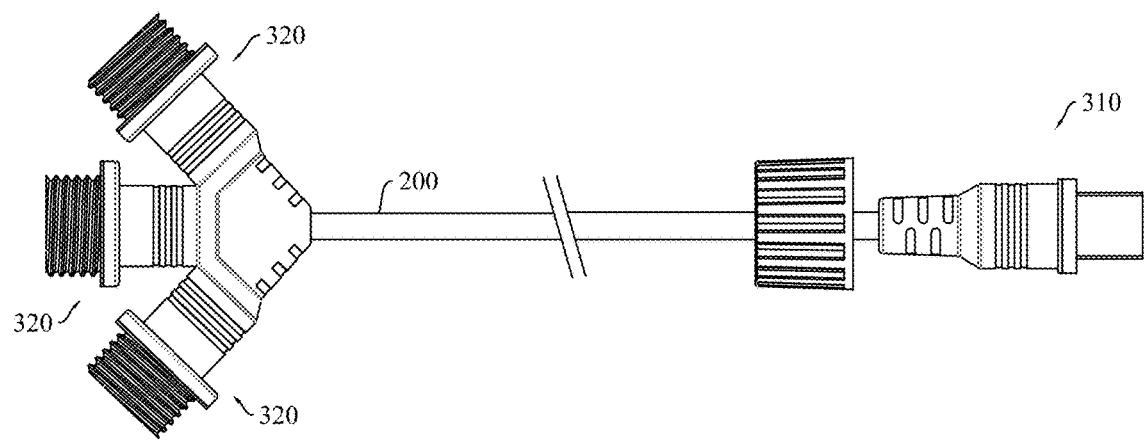
FIG. 19 is a structural schematic diagram of the second type of cable extension cord.

In some embodiments, the second end of the cable extension cord is provided with the second interfaces 320 of a plurality of the connectors 300. For example, as shown in FIG. 19, the second end of the cable extension cord is provided with three independent second interfaces 320.

Of course, in some embodiments, the first end of the cable extension cord can also be provided with the first interfaces 310 of a plurality of the connectors 300.

The above is merely illustrative of the preferred embodiments of the present disclosure and is not intended to limit the present disclosure, and various modifications and variations may be made on the present disclosure by those skilled in the art. Any modification, equivalent substitution, improvement, etc. made within the spirit and principles of the present disclosure should be included in the scope of protection of the present disclosure.

What is claimed is:

1. A waterproof connector which is configured to connect cables,
comprising:
a first interface which comprises:
a plug handle, wherein a first end of the plug handle is provided with a plug extending outwards, a junction of the plug and the cable is encapsulated in the plug handle;
a second interface which comprises:
a socket handle, wherein a first end of the socket handle is provided with a socket extending inwards, a junction of the socket and the cable is encapsulated in the socket handle; and
a first waterproof cap, sleeved on an outer side of the plug handle and an outer side of the socket handle;
wherein the plug is capable of being selectively inserted in the socket, such that an end face of the first end of the plug handle is closely fitted with an end face of the first end of the socket handle;
the plug is of a USB interface structure;
the socket is of a USB interface structure; and
the plug is electrically connected to the socket by a USB protocol.

2. The connector according to claim 1, wherein an outer wall of the plug handle is circumferentially provided with a first protruding edge extending outwards, the first protruding edge limits at least one part of the first waterproof cap on a side of the plug handle away from the first end thereof.

3. The connector according to claim 2,
wherein the outer side of the plug handle is sleeved with a first waterproof gasket, and the first waterproof gasket is provided between the first waterproof cap and the first protruding edge.

4. The connector according to claim 1,
wherein an outer wall of the socket handle is circumferentially provided with a second protruding edge extending outwards, and the second protruding edge is provided on the side of the socket handle away from the first end thereof; and
the plug is capable of being selectively inserted in the socket, such that the first waterproof cap is closely fitted with the second protruding edge.

5. The connector according to claim 4,
wherein the outer side of the socket handle is further sleeved with a third waterproof gasket, and the third waterproof gasket is provided between the first waterproof cap and the second protruding edge.

6. A cable extension cord,
comprising:
a cable; and
a waterproof connector which is configured to connect cables and comprises:
a first interface which comprises:
a plug handle, wherein a first end of the plug handle is provided with a plug extending outwards, a junction of the plug and the cable is encapsulated in the plug handle,
a second interface which comprises:
a socket handle, wherein a first end of the socket handle is provided with a socket extending inwards, a junction of the socket and the cable is encapsulated in the socket handle; and
a first waterproof cap, sleeved on an outer side of the plug handle and an outer side of the socket handle; the plug is capable of being selectively inserted in the socket, such that an end face of the first end of the plug handle is closely fitted with an end face of the first end of the socket handle;
a first end of the cable is provided with the first interface of the waterproof connector; and
a second end of the cable is provided with the second interface of the waterproof connector;
wherein the plug is of a USB interface structure;
the socket is of a USB interface structure; and
the plug is electrically connected to the socket by a USB protocol.

7. The cable extension cord according to claim 6,
wherein the first end of the cable is provided with the first interfaces of a plurality of the waterproof connectors, and/or
the second end of the cable is provided with the second interfaces of a plurality of the waterproof connectors.

8. A waterproof string light,
comprising:
cables; and
waterproof connectors which are configured to connect the cables, wherein each of the waterproof connectors comprises:
a first interface which comprises:
a plug handle, wherein a first end of the plug handle is provided with a plug extending outwards, a junction of the plug and the cable is encapsulated in the plug handle,
a second interface which comprises:
a socket handle, wherein a first end of the socket handle is provided with a socket extending inwards, a junction of the socket and the cable is encapsulated in the socket handle,
a first waterproof cap, sleeved on an outer side of the plug handle and an outer side of the socket handle;
wherein the plug is capable of being selectively inserted in the socket, such that an end face of the first end of the plug handle is closely fitted with an end face of the first end of the socket handle;
a first end of each of the cables is provided with at least one of the first interface of the waterproof connectors, and a second end of the cable is provided with at least one of the second interface of the waterproof connectors; and
the cables are provided with a plurality of light modules;
wherein the waterproof string light further comprises a solar power supply device; the solar power supply device comprises a circuit board, and a solar cell panel and the first interface or/and the second interface of the at least one of the waterproof connectors which are electrically connected to the circuit board.

9. The waterproof string light according to claim 8,
wherein the first interface or/and the second interface of the at least one of the waterproof connectors is/are electrically connected to the circuit board by a cable.

10. The waterproof string light according to claim 8,
wherein the solar power supply device further comprises a support frame.

11. The waterproof string light according to claim 8,
wherein the solar power supply device further comprises a cell, and the cell is electrically connected to the circuit board.

12. The waterproof string light according to claim 8, comprising a mobile power supply apparatus,
wherein the mobile power supply apparatus comprises a cell and a circuit board electrically connected to the cell; and
the circuit board is provided with at least one of the first interface or/and the second interface of the waterproof connectors.

13. The waterproof string light according to claim 8,
wherein each of the light modules comprises a light holder and a bulb mounted on the light holder, and the respective cable is electrically connected to the light holder.

14. The waterproof string light according to claim 13,
wherein the light module further comprises a connection base,
wherein the connection base is separated from the light holder and is electrically connected to the light holder by a wire.

15. The waterproof string light according to claim 13,
wherein the light module further comprises a hanging member.

* * * * *